United States Patent Office 3,068,775
Patented Dec. 18, 1962

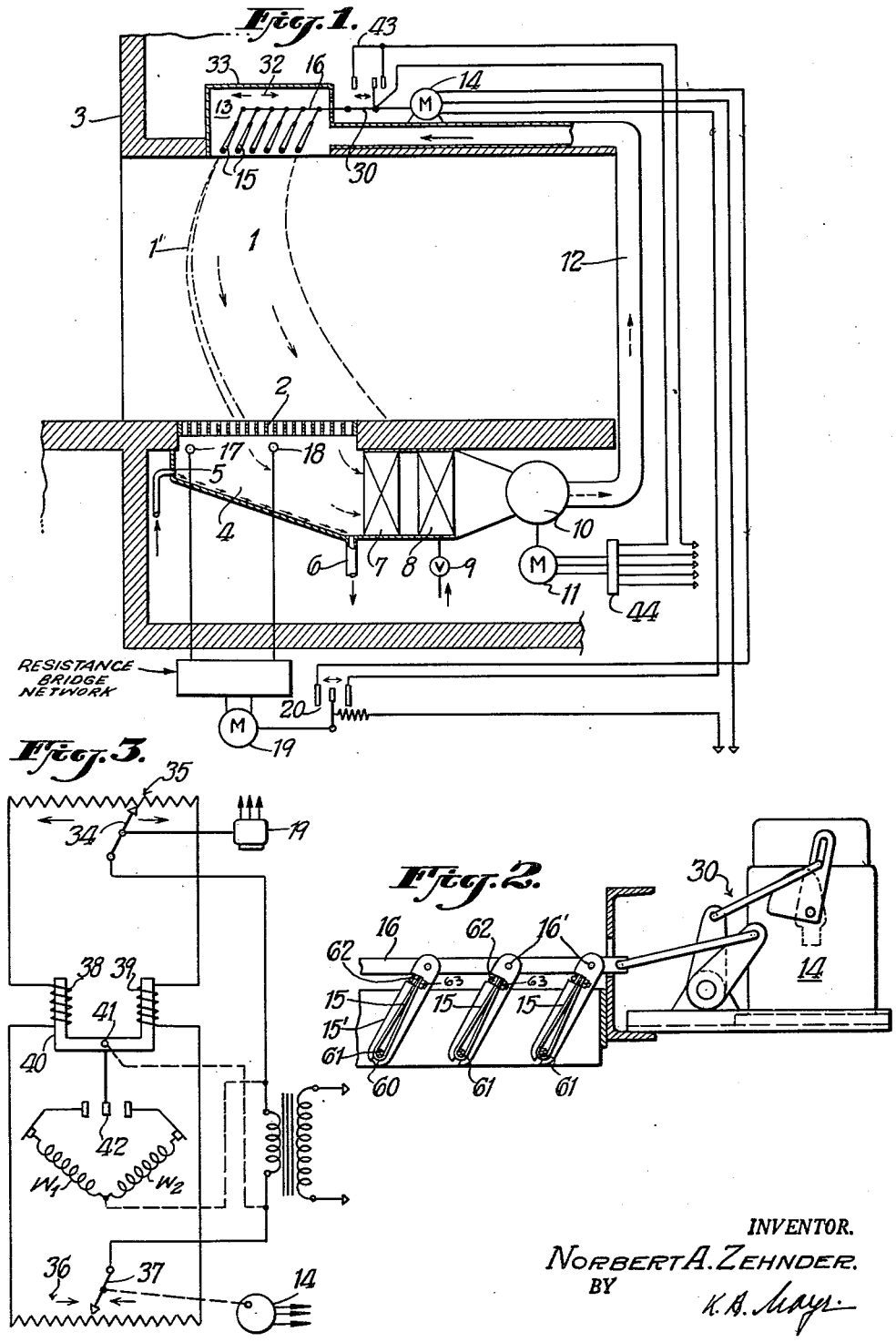

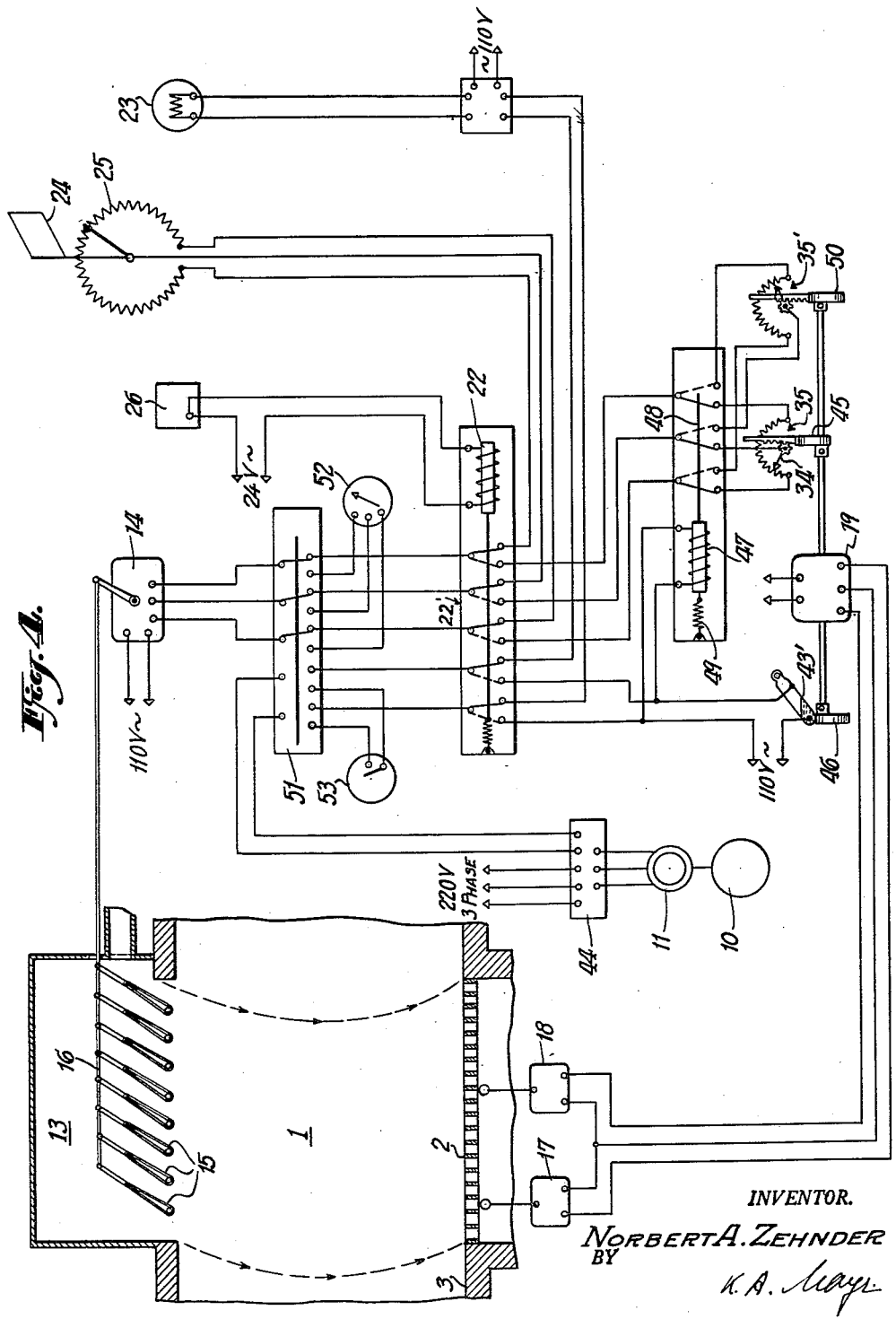

3,068,775
CONTROL SYSTEM FOR AN AIR CURTAIN SEALING THE ENTRANCE OF A BUILDING
Norbert A. Zehnder, Jackson Heights, N.Y., assignor to Sulzer Frères, S.A., Winterthur, Switzerland, a corporation of Switzerland
Filed May 13, 1959, Ser. No. 812,878
8 Claims. (Cl. 98—36)

The present invention relates to a system for separating spaces in which different temperatures, pressures, dust or odor conditions prevail, and for simultaneously providing an unobstructed entrance or exit to and from said spaces. The system with which the invention is particularly concerned is generally known as doorless door, aircurtain, airscreen, and the like, and is used instead of doors, inter alia, by banks, department stores, supermarkets, airport and other buildings in which there is much human traffic.

A typical installation of this type includes an outlet grill arranged on top of a door opening, a floor grating covering a pit below the door opening, means including ducts, fans, motors, for circulating air from the floor grating through connecting ductwork to the outlet opening filters, heating or cooling devices for conditioning the air before it flows from the outlet grill to the pit for forming the airscreen, and controls for the entire system.

A primary object of the invention is to provide a control system affording fully automatic operation of an aircurtain or doorless door system of the type generally described above. The control system according to the invention includes a combination of controls responding to small temperature differentials, adapted to control the aircurtain at outside temperatures below a certain reference temperature, for instance 55° F., and of electronic electric controls responding to wind velocity and wind direction, adapted to control the aircurtain at outside temperatures above the aforesaid reference temperature. With the system according to the invention the operation of an airscreen or aircurtain formed across the entrance opening of a building for separating the inside of the building from the outside is fully automatically controlled during the whole year, i.e. through all four seasons, whereby all components of the system are adjusted to climatological conditions in a most accurate manner.

The novel features which are considered characteristic of the invention are set forth with particularity in the appended claims. The invention itself, however, and additional objects and advantages thereof will best be understood from the following description of embodiments thereof when read in connection with the accompanying drawing, in which:

FIG. 1 is a diagrammatic vertical sectional view of a doorway including an aircurtain according to the invention.

FIG. 2 is a diagrammatic more detailed illustration of the vane arrangement for controlling the direction of the air discharged into the doorway for forming an aircurtain.

FIG. 3 is an electric circuit diagram used in the control arrangement according to the invention.

FIG. 4 is an electric circuit diagram of the entire hot and cold weather aircurtain control system according to the invention.

Referring more particularly to FIG. 1, numeral 1 designates an airscreen extending across an opening connecting the outside with the inside of a building 3. Air which has formed an invisible screen across the opening is sucked through a floor grating 2 into a chamber or pit 4. Larger particles of dust and dirt are eliminated from the air stream by a conventional automatically operated flushing device receiving water through an inlet 5 and discharging it through an outlet 6. Thereupon the air is passed through and further cleaned in a filter 7. The clean air is heated or cooled in a heat transfer device 8 by a heating medium or coolant whose flow is controlled by a valve 9 which may be automatically controlled by conventional means, not shown, to maintain a desired temperature of the airscreen. The cleaned and heated or cooled air is drawn by a blower or blowers 10 driven by a multispeed or a single speed motor or motors 11 into a duct 12 for delivering the air into a chamber 13 which is on top of the opening which is closed by the airscreen. The air leaves the chamber 13 between flow directing vanes 15 to form the airscreen 1 before it is drawn through the floor grating 2.

Differences in air pressure inside and outside of the building cause a displacement of the aircurtain. If the outside pressure exceeds the inside pressure, the aircurtain is blown into the building and vice versa unless the kinetic energy of the moving air is sufficiently great to withstand the effect of the pressure difference. The pressure on the outside of the aircurtain is usually higher than the air pressure acting on the inside of the aircurtain when a wind starts to blow in a direction toward the door and/or when the outside temperature drops below the temperature inside of the building so that the latter acts like a chimney. For the air curtain to be effective it is essential that it is so shaped that as much as possible of the air leaving the vanes 15 enters the grating 2. Whether the air will do this depends on the velocity and the direction at which the air leaves the vanes 15.

In order to control the direction of the air current leaving the vanes the angular position of the vanes can be adjusted. FIG. 2 illustrates an example of a vane adjustment mechanism including a motor 14 acting through a linkage 30 on a rod 16 to which a plurality of plates 15' is pivoted at 16'. The lower ends of the plates 15' have recesses 60 individually receiving a rod 61 whose ends are rotatably supported by suitable stationary bearings, not shown. Individual guide vanes 15 are formed by wrapping suitable sheet material around the rods 61 and connecting the upper marginal portions of the sheet material to flaps 62 bent out of the plates 15', by means of bolts 63 or other suitable means. If the vanes 15 are very long, i.e. if the building entrance and the aircurtain are very wide, intermediate hangers or supports may be provided for holding the rods 61 in the desired position. Movement of the rod 16 to the right in FIG. 2 will turn the vanes 15 in clockwise direction through a vertical position to the illustrated position where the air is directed to leave the vanes at a slant to the left.

For checking the position of the airscreen show in FIG. 1 relatively to the grate 2 a temperature sensitive element 17 is provided at the edge of the grate facing the outside of the building. A second temperature sensitive element 18 is provided within the grate, for example, halfway between the outer edge and the inner edge of the grate. The temperature sensitive elements 17 and 18 may typically be resistance elements such as thermistors having high negative temperature coefficients of resistance, i.e., the value of the resistance of the individual elements decreases rapidly as the temperature rises and increases as the temperature falls. When the outside temperature is below, say 55° F. and the temperature inside of the building and the temperature of the air forming the aircurtain are relatively high, a displacement of the outer layer 1' of the aircurtain towards the inside of the building, for example, to the position shown in FIG. 1 reduces the temperature at the device 18 the farther the aircurtain moves into the building. If the aircurtain moves from the inside to the outside of the building the temperature at the device 17 increases. Means are available today such as an electrical resistance bridge network as illustrated in FIG. 1 to effect running of a motor 19, electrically connected to the temperature sensitive elements 17 and 18. Rotation of the motor 19 is effected in one direction upon a decrease of the temperature at the device 17 and to run in the opposite direction upon a decrease of the temperature of the device 18. A decrease of the temperature of the device 18 causes the motor 19 to run in a direction to close a switch 20 for operating the motor 14 in the direction effecting placing the vanes 15 in a more outwardly slanted position (arrow 32) and an increase of the temperature of the device 17 causes the motor 14 to run in the opposite direction, placing the vanes in a more vertical or even inwardly slanted position (arrow 33).

The electrical resistance bridge network shown diagrammatically in FIG. 1 may typically include a motor control circuit of the type illustrated and described in U.S. Patent 2,403,917 entitled "Control Apparatus." This network comprises a balanced bridge circuit wherein the individual temperature sensitive elements 17 and 18 comprise two arms. Upon an imbalance of the bridge, caused by a change in the resistance value of one or the other of the temperature sensitive elements, an output voltage is sensed across the output terminals of the bridge. The output of the bridge is fed to an amplifier and power unit. The output of the amplifier is then, in turn, fed to the field bridges of the reversible motor 19 through a suitable transformer.

In operation, the phase of the output voltage from the amplifier will vary in accordance with the manner in which the resistance of the temperature sensitive elements 17 and 18 changes. The phase of the output voltage fed to the motor 19 will determine the direction of rotation of the motor 19.

It will be appreciated that so long as the temperature sensing elements 17 and 18 are exposed to the transient air of the air curtain which is of the desired temperature, the bridge network is in balance and consequently there is no output to energize the motor 19. However, when the temperature of the transient air of the air curtain varies, the resistance value of one or the other or both of the elements 17 and 18 varies, thereby unbalancing the bridge network. Upon unbalance, a signal is fed the motor 19 through the amplifier causing it to rotate in one direction or the other in an attempt to restore a balanced condition. The rotation of the motor 19 simultaneously actuates the switch 20 in a direction to restore the desired air curtain conditions.

A typical operating example of the system is where the temperature sensitive device 17 is set at 60° F. and the temperature sensitive device 18 is set at 70° F. The system is then such that any temperature at 17 above 60° F. will cause the motor 19 to be energized through an unbalance of the associated bridge network, while any temperature below 60° F. will not be effective to unbalance the bridge to energize the motor 19. Likewise any temperature at the device 18 which is below 70° F. will cause the bridge network to be unbalanced and operates the motor 19 while any temperature above 70° F. will have no effect on the bridge network and therefore no energization of the motor 19 will be realized.

Instead of actuating the switch 20, the motor 19 may actuate a finger 34 of a controller potentiometer 35 (FIG. 3) forming part of an electric bridge circuit including a second potentiometer 36 whose finger 37 is actuated by the shaft of the motor 14. The branches of the circuit individually include relay coils 38, 39 actuating an armature 40 swinging on a pivot 41 and actuating a switch 42. The switch affords current flow through the windings $W_1$ and $W_2$ of the motor 14 for running in clockwise direction or in counterclockwise direction. This device, which is conventional, can be so designed that the bridge is in balance so that the motor 14 stops whenever the motor and vanes 15 connected thereto are in a position corresponding to the setting of the finger 34 which is proportional to the difference between the temperatures sensed by the devices 17 and 18.

When the motor 14 (FIG. 1) has been turned so that the vanes 15 have reached one of their end positions a switch 43 is closed for actuating a conventional device 44 for speeding up the fan motor 11.

The system can be so arranged that the vanes 15 are moved through a part, for example one half, of their path whereupon the speed of the motor 11 is increased and, if that does not return the lower end of the aircurtain to a position coinciding with the grate 2, the vanes 15 are moved through the second half of their path whereupon the motor 11 is still more sped up. Initially the switch 48 is in the position shown in full lines in FIG. 4. This can be done by providing a cam 45 (illustrated in FIG. 4) on the shaft of the motor 19 which cam actuates the wiper 34 of the potentiometer 35 for turning the motor 14 through one half of its total possible movement. Thereupon a second cam 46 moves a switch 43' to closing position for speeding up the fan motor 11. Simultaneously, a solenoid 47 is energized for actuating a switch 48, as illustrated in dotted lines in FIG. 4, against the action of a spring 49 for disconnecting the potentiometer 35 from the motor 14 and connecting a second potentiometer 35' to the motor 14. The potentiometer 35' is actuated by a third cam 50, also mounted on the shaft of the motor 19. The cam 46 can be so designed that when the potentiometer 35' reaches its extreme position, whereby the vanes 15 have also reached their extreme position, the device 44 is once more actuated to once more step up the speed of the fan motor 11. Instead of this alternate operation of the guide vanes 15 and the speeding up of the fan motor, the apparatus can be so arranged that movement of the vanes away from the vertical position and speeding up of the motor and movement of the vanes 15 toward the vertical position and reduction of the speed of the motor 14 are effected simultaneously. Any desired combination can be obtained by suitably shaping the cams 45, 46, 50 and by placing them at a suitable angular position on the shaft on the motor 19. For example, the vanes 15 may be moved away from their vertical position whereupon the speed of the motor 11 is increased and the vanes are simultaneously returned to the vertical position to be ready to be once more moved from their vertical position, if the air forming the airseal across the doorway does not flow into the grate 2.

When the lower end of the aircurtain coincides with the grate 2 the temperature difference between the positions 17 and 18 has been so reduced that the motor 19 is not actuated and the apparatus remains in the attained position.

Should the aircurtain move farther outward of the building entrance, the temperature at 17 increases, causing the motor 19 to move in the opposite direction whereby the apparatus is actuated in reverse to the aforedescribed operation.

The aforedescribed control system operates as long as the outside temperature is lower than approximately 55° F. and the temperature inside the building or at least that of the aircurtain is higher than the outside temperature. If these temperature conditions are not available, as in summer, a different control system must be used.

As seen in FIG. 4, a temperature sensing element 26 is provided which responds to temperatures above a reference temperature, for example, 55° F. and transmits a signal to a relay 22 which actuates a switch 22' for changing the control of the motors 14 and 11 from the temperature differential control system to a control system which is responsive to wind velocity and wind direction. For sake of clarity, the switch 22' is shown in the typical winter setting. In the summer, the temperature sensitive device 26 causes a raise in temperature above a predetermined value and energizes the solenoid 22 to cause the armature of switch 22' to close the contacts thereof as illustrated in full lines. The normal switch setting is such that there is no signal from the device 26 to energize the solenoid 22, and consequently the switch spring returns the switch contacts back to the position in dashed lines in FIG. 4. If desired, the switch 22' can be controlled by the temperature sensitive means 17 so that the device 26 can be omitted.

The wind direction is indicated by a weather vane 24 which may be placed on top of the building whose entrance is provided with an air door, or at any place where the wind direction is substantially the same as at the air door.

The vane 24 actuates the wiper of a potentiometer 25 which is connected to the motor 14 in the same manner as the potentiometers 35, 35' were connected to the motor 14 prior to actuation of the switch 22'. In this way the vanes 15 are moved clockwise, i.e. towards the outside of the building, when the wind is blowing from the outside toward the entrance. When the wind is blowing from the opposite side the potentiometer 25 operates the motor 14 to swing the vanes 15 counterclockwise to direct the aircurtain toward the inside of the building, to counteract the negative wind pressure. When the wind blows in a direction which is parallel to the plane of the air door, the vanes 15 are in vertical position.

In addition to the control movements caused by changes in wind direction, a wind velocity sensitive element 23 produces a signal for actuating the control 44 of the fan motor 11 in such a way that the speed of the motor is increased upon an increase of the wind velocity. The wind velocity sensing element 23 can be preset, for example, so that the fan motor 11 runs at low speed for winds of 0–5 m.p.h., at medium speed for winds of 5–10 m.p.h. and at high speed for winds above 10 m.p.h. Wind velocity sensitive apparatuses are available today which include a so-called thermistor forming the variable resistor of a Wheatstone bridge circuit. These apparatuses, per se, are not claimed as the invention and are therefore not described and shown in detail.

In addition to the relay actuated switch 22' for automatically switching the system from the control which is responsive to the temperature differential at the grate 2, i.e. the cold weather control, to the control in response to the wind direction and wind velocity, i.e. the hot weather control, a manually operable switch 51 may be provided for connecting the motor 14 to and controlling the motor 14 in response to the setting of a manual potentiometer 52 and for controlling the speed of the motor 11 by means of a switch 53 instead of controlling the motor 14 automatically in response to the wind direction and velocity. The switch 51 is shown in the drawings at a position whereby the system is automatically controlled. In the opposite setting the switch 51 reorders the system manually controllable.

I claim:

1. A system for controlling the flow direction of a flowing mass of air forming an aircurtain across an opening connecting the outside of a building with the inside of the building, said system including an air outlet for supplying air to said opening, an air return opening substantially opposite said outlet for receiving air from said opening, adjustable air flow directing means connected with said outlet for adjusting the direction of the air flow across the opening, temperature sensitive means placed in said return opening in the normal path of the air forming the aircurtain, said temperature sensitive means including at least two temperature sensitive elements, a first of said elements being disposed adjacent a marginal edge of said return opening at the outside of said building and a second of said elements disposed substantially in the middle of the normal path of the aircurtain passing through said return openings, and means responsive to the temperatures sensed by said temperature sensitive means for actuating said adjustable air flow directing means in a direction causing the aircurtain to be deflected inwardly when said first element senses a temperature above a predetermined value and to be deflected outwardly when said second element senses a temperature below a predetermined value.

2. A system for controlling the flow direction of a flowing mass of air forming an aircurtain across an opening connecting the outside of a building with the inside of the building, said system including an air outlet for supplying air to said opening, an air return opening substantially opposite said outlet for receiving air from said opening, air flow producing means for blowing air from said outlet across the opening to said inlet, control means operatively connected to said air flow producing means for controlling the amount of air blown across the opening, adjustable air flow directing means connected with said outlet for adjusting the direction of the air flow across the opening, and temperature sensitive means placed in said return opening in the normal path of the air forming the aircurtain, said temperature sensitive means including at least a first and a second temperature sensitive element, the first of said elements being disposed adjacent a marginal edge of said return opening at the outside of said building, the first of said element being responsive to a temperature above a predetermined value, the second of said elements being disposed substantially in the middle of the normal path of the air current passing through said return opening, the second of said elements being responsive to a temperature below a predetermined value, and means responsive to the temperatures sensed by said temperature sensitive means connected to said adjustable air flow directing means and to said control means for directing the air flow towards the outside of the building and for increasing the amount of air blown across the opening upon a decrease in the temperature sensed by the second of said temperature sensitive elements below the predetermined value and for directing the air flow towards the inside of the building and for decreasing the amount of air blown across the opening upon an increase in the temperature sensed by the first of said temperature sensitive elements above the predetermined value.

3. A system for controlling the flow direction of a flowing mass of air forming an aircurtain across an opening connecting the inside of a building with the outside, said system including an air outlet for supplying air to said opening, an air return opening substantially opposite said outlet for receiving air from said opening, adjustable air flow directing means connected to said outlet for adjusting the direction of the air flow across the opening, a first temperature sensitive means placed in the marginal portion of said return opening which marginal portion is adjacent to the outside of said building, said first temperature sensitive means being responsive to a temperature above a predetermined value, a second temperature sensitive means placed adjacent to said return opening substantially in the middle of the normal path of the air passing through said return opening, said second temperature sensitive means being responsive to a temperature below a predetermined value, and means responsive to said temperature sensitive means connected to said air flow directing means for directing the air flow towards the outside of the building upon a decrease of the temperature sensed by said second temperature sensitive means below the predetermined value, and for directing the air flow towards the inside of the building upon an increase of the temperature sensed by said first temperature sensitive means above the predetermined value.

4. A system for controlling the flow direction of a flowing mass of air forming an aircurtain across an opening connecting the outside of a building with the inside of the building, said system including an air outlet for conducting air to said opening, an air inlet substantially opposite said outlet for receiving air from said opening, control means for controlling the amount of air flowing across the opening, adjustable air flow directing means placed in said outlet for adjusting the direction of the air flow across the opening, a first temperature sensitive means placed in the marginal portion of said inlet at the outside of the building, a second temperature sensitive means placed adjacent to said return opening substantially in the middle of the normal path of the air leaving said opening through said return opening, said temperature sensitive means being operatively connected to said air flow directing means and to said control means for directing the air flow towards the outside of the building and for increasing the amount of air flowing across the opening upon a decrease of the temperature sensed by said second temperature sensitive means, and for directing the air flow towards the inside of the building and for decreasing the amount of air flowing across the opening upon an increase of the temperature sensed by said first temperature sensitive means, a vane responsive to the wind direction at the building having said opening, said vane being operatively connected to said air flow directing means for directing the air flow across the opening towards the outside of the building when the wind is directed towards said opening and for directing the air flow across the opening towards the inside of the building when the wind blows in the opposite direction, and switch means interposed between said temperature sensitive means and said control means as well as said air flow directing means and between said vane and said air flow directing means for disconnecting said control means and said air flow directing means from said temperature sensitive means and for operatively connecting said vane to said air flow directing means.

5. A system for controlling the flow direction of a flowing mass of air forming an aircurtain across an opening connecting the outside of a building with the inside of the building, said system including an air outlet for conducting air to said opening, an air return opening substantially opposite said outlet for receiving air from said opening, control means for controlling the amount of air flowing across the opening, adjustable air flow directing means placed in said outlet for adjusting the direction of the air flow across the opening, a first temperature sensitive means placed adjacent to said return opening substantially in the middle of the normal path of the air leaving said opening through said inlet, a second temperature sensitive means placed in the marginal portion of said return opening at the outside of the building, said temperature sensitive means being operatively connected to said air flow directing means and to said control means for directing the air flow towards the outside of the building and for increasing the amount of air flowing across the opening, upon a decrease of the temperature sensed by said first temperature sensitive means, and for directing the air flow towards the inside of the building and for increasing the amount of air flowing across the opening upon an increase of the temperature sensed by said second temperature sensitive means, a vane responsive to the wind direction at the building having said opening, said vane being operatively connected to said air flow directing means for directing the air flow across the opening towards the outside of the building when the wind is directed towards said opening and for directing the air flow across the opening towards the inside of the building when the wind blows in the opposite direction, a device responsive to the temperature outside of the building, and switch means interposed between said temperature responsive device and said control means as well as said air flow directing means and between said vane and said air flow directing means for disconnecting said control means and said air flow directing means from said temperature sensitive means and for operatively connecting said vane to said air flow directing means when the temperature outside of the building rises above a predetermined value.

6. A system as defined in claim 5 including a device responsive to the wind velocity and operatively connectable to said control means by said switch means for varying the amount of air flowing across said opening in proportion to the wind velocity.

7. A system for controlling the flow direction of a flowing mass of air forming an aircurtain across an opening connecting the outside of a building with the inside of the building, said system including an air outlet for conducting air to said opening, an air return opening substantially opposite said outlet for receiving air from said opening, adjustable air flow directing means placed in said outlet for adjusting the direction of the air flow across the opening, and a vane responsive to the wind direction at the building having said opening, and means for operatively connecting said vane to said air flow directing means for directing the air flow across the opening towards the outside of the building when the wind is directed towards said opening and for directing the air flow across the opening towards the inside of the building when the wind blows in the opposite direction.

8. A system as defined in claim 7 including control means for controlling the amount of air flowing across the opening, and a device responsive to the wind velocity at the building having said opening and operatively connected to said control means for varying the amount of air flowing across said opening in proportion to the wind velocity.

References Cited in the file of this patent

UNITED STATES PATENTS

| | | |
|---|---|---|
| 2,763,195 | Caldwell | Sept. 18, 1950 |
| 2,863,373 | Steiner | Dec. 9, 1958 |